United States Patent
Chang et al.

[15] 3,674,856
[45] July 4, 1972

[54] REACTION OF 1, 3-BUTADIENE AND ORGANIC SULFONYL HALIDES

[72] Inventors: Charles H. Chang, Piscataway, N.J.; David I. Randall, Easton, Pa.

[73] Assignee: RAF Corporation, New York, N.Y.

[22] Filed: Oct. 2, 1969

[21] Appl. No.: 863,383

Related U.S. Application Data

[63] Continuation-in-part of Ser. No. 605,623, Dec. 29, 1966, abandoned.

[52] U.S. Cl. .................................260/607 A, 71/66, 71/91, 71/103, 260/468 R, 260/481 R, 260/514 R, 260/526 S, 260/543 R, 260/557 R, 260/561 S
[51] Int. Cl. ...........................................................C07c 147/04
[58] Field of Search .............................................260/607 A

[56] References Cited

FOREIGN PATENTS OR APPLICATIONS

| | | | |
|---|---|---|---|
| 1,409,516 | 7/1965 | France | 260/607 A |
| 654,544 | 2/1965 | Belgium | 260/607 A |

*Primary Examiner*—Joseph Rebold
*Assistant Examiner*—D. R. Phillips
*Attorney*—Samson B. Leavitt and Walter C. Kehm

[57] ABSTRACT

Compounds of the formula $Y_n\text{-R-SO}_2\text{CH}_2\text{CH=CHCH}_2\text{X}$ wherein X is Cl or Br; Y is Cl, Br, or nitro; R is alkylene or cycloalkylene of one to six carbon atoms; and $n$ is an integer of 1 to 5, such as 4-chlorobut-2-enyl-2'-chloroethyl sulfone, prepared for example by reaction of halo- or nitro-substituted alkylene or cycloalkylene sulfonyl halide with butadiene. Such compounds are useful as aquatic herbicides, pesticides, and fiber-reactive dyestuff intermediates.

2 Claims, No Drawings

REACTION OF 1,3-BUTADIENE AND ORGANIC SULFONYL HALIDES

This application is a continuation-in-part of our application Ser. No. 605,623 filed Dec. 29, 1966, and now abandoned.

This invention relates to a new and improved method for reacting an aliphatic sulfonyl halide with 1,3-butadiene and to the novel products of such process.

The reaction of 1,3-butadiene with methanesulfonyl chloride and with benzene sulfonyl chloride have been reported in J.C.S. 4962 (1964) by Asscher and Vofsi. They employed liquid air to cool the reaction mixture so that air in the reactor could be evacuated by a vacuum pump without vaporizing butadiene and the methylene chloride employed as the reaction medium. The authors reported methylene chloride to be the only solvent for these addition reactions, used triethylamine hydrochloride and acetonitrile apparently as an assistant, complexing and/or solubilizing agent for the cupric chloride catalyst, and employed the disodium salt of ethylenediamine tetraacetic acid for the removal of the copper catalyst from the reaction medium.

These previously reported processes are subject to a number of disadvantages. In view of the specificity of the disclosures, it is not apparent that they would be operative with other organic sulfonyl chlorides. As a matter of fact, a number of such other organic sulfonyl chlorides are insoluble in methylene chloride, although it is recognized that optimum results are generally obtained when the reactants are soluble in the reaction medium. The use of liquid air and evacuation is a troublesome and relatively expensive procedure. Use of triethylamine hydrochloride and acetonitrile to assist, solubilize and/or complex the cupric chloride catalyst, and of a chelating agent such as ethylenediamine tetraacetic acid or its salts for removing the copper catalyst from the reaction mixture is likewise troublesome.

It is an object of this invention to provide a process which will not be subject to one or more of the above disadvantages. Another object of the invention is the provision of novel chemical compounds through use of the aforementioned process. Other objects and advantages will appear as the description proceeds.

The attainment of the above objects is made possible by our discoveries that the use of liquid air and evacuation was not necessary in the foregoing reactions, that the reactions could be carried out without exclusion of air, that copper catalyst could be removed from a methylene chloride reaction medium by evaporating volatiles, dissolving the residue in ether, and washing the ether solution with dilute acid, that methylene chloride was inoperative for reactions involving reactants such as organic sulfonyl chlorides insoluble in methylene chloride, that ether, N-methylpyrrolidone, and N,N-dimethyl-formamide or -acetamide constitute excellent solvents for these reactions because they dissolve the cupric chloride catalyst in addition to one or both reactants whether substituted or not and enable elimination of triethylamine-HCl and acetonitrile, and that these improved solvents further permit removal of the copper catalyst from the reaction mixture with minimal decomposition of the reaction product and without the troublesome use of a chelating agent.

The invention accordingly comprises a method of reacting an organic sulfonyl halide of the formula $Y_n$-R-$SO_2$X, wherein X is Cl or Br, Y is Cl, Br, nitro, —COOH, —COOR, or —NROCR$_1$; R$_1$ is H or R; R is alkylene or cycloalkylene of one to six carbon atoms; and $n$ is an integer of 1 to 5, with 1,3-butadiene without exclusion of air. As a further improvement, the invention comprises carrying out the aforementioned process in an ether, N-methylpyrrolidone, or N,N-dimethyl-formamide or -acetamide reaction medium. When employing ether as the reaction medium, the catalyst is readily removed therefrom upon completion of the reaction by washing with dilute HCl or other acid. When using the water soluble N-methylpyrrolidone, N,N-dimethylformamide or N,N-dimethylacetamide as the reaction medium, removal of copper catalyst and recovery of the desired reaction product are readily accomplished by drowning the final reaction mixture in water to precipitate the reaction product which may then be separated by filtration.

The novel compounds of the present invention are those of the formula

I. $Y_n$-R-$SO_2CH_2CH=CHCH_2$X wherein X is Cl or Br; Y is Cl Br, nitro, —COOH, —COOR, or —NROCR$_1$; R$_1$ is H or R; R is alkylene or cycloalkylene of one to six carbon atoms; and $n$ is an integer of 1 to 5.

In the above formulas alkylene and cycloalkylene refer to any such saturated divalent straight or branched radical of one to six carbon atoms including methylene to hexylene, cyclopentylene and cyclohexylene; R$_1$ and R$_2$, and Y (when $n$ is more than 1) may be the same or different; and the maximum value of $n$ depends on the number of carbon atoms in R, i.e. whether it contains five replaceable C-bonded H atoms.

Representative compounds of the invention include those of the above formula I wherein X is Cl and $Y_n$-R is 2-chloroethyl, 3-chloropropyl, 2,6-dinitrohexyl, 3-bromo-4-nitrobutyl, 3-carboxypropyl, chloromethyl, 3-carbethoxy-4-chloropentyl, 3-acetamidopropyl, 4-(N-methyl)acetamidobutyl, 2-(N-methyl)butanoylamidopropyl, 3-chlorosulfolane, and the like, and the corresponding compounds wherein X is Br.

Compounds of the above formula I are prepared by reaction in a suitable reaction medium of an organic sulfonyl halide of the formula $Y_n$-R-$SO_2$X with an approximately equimolar amount of 1,3-butadiene wherein the variables have the values given above, without exclusion of air in the presence of cupric chloride catalyst with triethylamine hydrochloride and acetonitrile as catalyst modifiers-assistants-solvents where required. The catalyst is employed in the usual proportions approximating 0.02 to 2 percent based on the weight of the sulfonyl halide reactant. When ether, N-methylpyrrolidone or N,N-dimethyl-formamide or -acetamide is employed as solvent, the use of the triethylamine hydrochloride and acetonitrile is dispensed with, thus constituting a further advantage in using these solvents as reaction medial herein. A still further advantage in the use of ether, N-methyl-pyrrolidone or N,N-dimethyl-formamide or -acetamide as the reaction medium in the present process resides in the facility of recovery and purification with diminished or minimal decomposition of the desired reaction product. Temperatures during the reaction may range from room temperature to the boiling point of the reaction medium, elevated temperatures ranging from about 70° to 110° C. being preferred. Super atmospheric pressures are often desirable, or at least use of pressure tight reaction vessels, particularly when using a volatile solvent such as ether as the reaction medium.

The reaction products described herein are characterized by the presence therein of a radical containing a highly reactive bromine or chlorine atom (X) activated by the adjacent vinyl sulfone linkage. As such, they are highly useful as reactants and intermediates in the production of other compounds and functional agents, in addition to being per se useful as effective herbicides against aquatic weeds and other plant life, pesticides, and the like.

Thus, the products of this invention are effective against aquatic weeds such as duckweed, salvinia, elodea, and potamogeton and the like when added to aqueous bodies containing them in concentrations of about 1 to 15, and generally about 10, p.p.m. (parts per million). In some instances, use of a water miscible mutual solvent such as acetone, alcohol or N-methylpyrrolidone may be employed to facilitate application.

Those products containing another reactive or potentially reactive radical as or in the Y group capable of reacting with a dyestuff molecule are further useful as intermediates in the production of fiber-reactive dyestuffs of any desired type, the reactive group in the resulting dyestuff being that part of the compounds of formula I above bonded to the $Y_n$-R group. The resulting dyestuffs containing at least one fiber-reactive 4-halo-2-butenylsulfonyl group of the formula —$SO_2CH_2$CH=CHCH$_2$X, and methods for their production from the compounds disclosed and claimed herein are disclosed in our copending application Ser. No. 605,627 entitled "Fiber-Reactive Dyestuffs" filed on Dec. 29, 1966, and now abandoned.

The following examples are only illustrative of this invention and are not to be regarded as limitative. All parts and proportions referred to herein and in the appended claims are by weight unless otherwise indicated.

A. In the examples, when methylene chloride is used as solvent, the volatile material is removed under aspirator vacuum at 40° C. after completion of the reaction. The residue is dissolved in ether and the solution washed with 350 ml. portions of 3N HCl and finally with water to remove copper catalyst. The washed ether solution is dried with anhydrous sodium sulfate and decantated. The ether solution after decantation is evaporated under reduced pressure (aspirator) on a steam bath to give the desired product.

B. When ether is used as solvent, triethylamine hydrochloride and acetonitrile are eliminated, and the final reaction medium washed directly with dilute HCl in a separatory funnel to remove copper catalyst, followed by the remainder of the procedure A.

C. When N-methylpyrrolidone, N,N-dimethylformamide or N,N-dimethylacetamide are employed as solvent, the final reaction medium is directly poured into 200 ml. of cold water with stirring and the desired precipitated product collected by filtration.

Structures of the products are supported by infrared (IR) analysis showing absorptions at 7.75μ and 8.82μ which are characteristic of sulfone groups.

EXAMPLE 1

4-chlorobut-2-enyl 2'-chloroethyl sulfone

In a sealed glass tube without exclusion of air, a mixture of 16.3 g. (0.1 mole) of 2-chloroethanesulfonyl chloride, 10.8 g. (0.2 mole) of 1,3-butadiene, 30 ml. of methylene chloride and a solution of 0.14 g. of cupric chloride and 0.2 g. of triethylamine hydrochloride in 2.5 ml. of acetonitrile is heated at 100° C. for 3 hours. The resulting mixture is evaporated under reduced pressure to remove the volatile materials. The residue is dissolved in ether and washed in a separatory funnel with 3N hydrochloric acid and water. The washed solution is dried over sodium sulfate and filtered. The filtrate is distilled to give 21.5 g. of product as an oil, b.p. 178°–80° C. (0.1 mm.); $n^{25}_D$ 1.5250.

Anal. Calc'd for $C_6H_{10}Cl_2O_2S$: C, 33.19; H, 4.64
Found: C, 33.93, H, 4.74

EXAMPLE 2 a. When the procedure of Example 1 is repeated omitting the triethylamine hydrochloride and acetonitrile, an unsatisfactory yield of about 5 g. of product is obtained.

b. When the foregoing procedure is repeated except for use of ether instead of methylene chloride as solvent and the final reaction mixture directly washed with 3N HCl and water, dried and filtered, an excellent yield of the desired product is obtained.

EXAMPLE 3

4-chlorobut-2-enyl 3'-chloro-n-propylsulfone

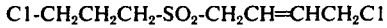

When 3-chloro-n-propanesulfonyl chloride is used instead of 2-chloroethanesulfonyl chloride in Example 2(b), the product of the above formula is similarly obtained in good yield.

EXAMPLE 4

4-chlorobut-2-enesulfonyl-n-butyric acid

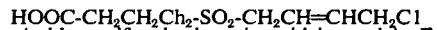

When 4-chlorosulfonyl-n-butyric acid is used in Example 2(b) as the sulfonyl chloride, the product of the above formula is similarly obtained in good yield. The corresponding ethyl ester is similarly obtained when using 4-chlorosulfonyl-n-butyric acid ethyl ester as the sulfonyl chloride.

EXAMPLE 5

3-acetamidopropyl 4'-chloro-but-2-enylsulfone

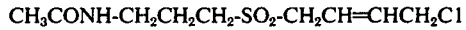

In a sealed glass tube without exclusion of air, a mixture of 19.85 g. (0.1 mole) of 3-acetamidopropanesulfonyl chloride, 10.8 g. (0.2 mole) of 1,3-butadiene, 20 ml. N-methylpyrrolidone and 0.17 g. of cupric chloride is heated at 100° C. for 3 hours. The mixture is poured into water and the precipitated reaction product filtered off and, if desired after extraction with ether, dried. The product of the above formula is obtained in good yield.

Similar results are obtained when using N,N-dimethylformamide or -acetamide instead of N-methylpyrrolidone as solvent.

EXAMPLE 6

4-chlorobut-2enyl 2'3'-dichloropropanysulfone

When 2,3-dichloropropanesulfonyl chloride is used in Example 2(b) as the sulfonyl chloride, the product of the above formula is similarly obtained in good yield. The corresponding 4-chlorobut-2-enyl 2'-nitro-3'-bromopropanylsulfone is similarly obtained when using 2-nitro-3-bromopropanesulfonyl chloride as the sulfonyl chloride.

EXAMPLE 7

When 3-chloro-4-chlorosulfonyl sulfolane is used in Example 2(b) as the sulfonyl chloride, the following compound is obtained in good yield.

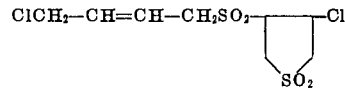

This invention has been disclosed with respect to certain preferred embodiments, and it will be understood that modifications and variations thereof will become obvious to persons skilled in the art and are intended to be included within the spirit and purview of this application.

We claim:
1. A compound of the formula

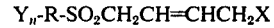

wherein
X is Cl or Br;
Y is nitro;
R is alkylene of three to six carbon atoms; and
n is 1 or 2.
2. A compound as defined in claim 1 wherein X is Cl.

* * * * *